(12) United States Patent
Karis et al.

(10) Patent No.: US 7,752,109 B2
(45) Date of Patent: Jul. 6, 2010

(54) METHOD OF DETERMINING PARAMETERS OF A LONG-TERM LEASE

(75) Inventors: James Karis, Moorabbin (AU); Warwick Manderson, Hawthorn East (AU)

(73) Assignee: Manderson M&F Consulting, Victoria (AU)

( * ) Notice: Subject to any disclaimer, the term of this patent is extended or adjusted under 35 U.S.C. 154(b) by 2 days.

(21) Appl. No.: 12/381,060

(22) Filed: Mar. 6, 2009

(65) Prior Publication Data

US 2009/0240618 A1    Sep. 24, 2009

Related U.S. Application Data

(63) Continuation of application No. 11/481,122, filed on Jul. 5, 2006, now abandoned.

(30) Foreign Application Priority Data

Feb. 14, 2006    (AU) ............................... 2006900718

(51) Int. Cl.
*G06Q 40/00*    (2006.01)
(52) U.S. Cl. ...................................................... 705/35
(58) Field of Classification Search ............. 705/36–38, 705/35, 39
See application file for complete search history.

(56) References Cited

U.S. PATENT DOCUMENTS

2003/0046199 A1*    3/2003    Murase et al. ................ 705/35

OTHER PUBLICATIONS

Comptroller's Handbook, Lease Financing, Jan. 1998.*
Long Term Ground Lease, the Redevelopment Option and Contract Incentives. David Dale-Johnson, Marshall School of Business, Lusk Center for Real Estate, University of Southern California, Jan. 2000.*
An Assessment of Lessor Accounting for Residual Values. Johnson et al., 1993 American Accounting Association, Accounting Horizons, vol. 7 No. 3, Sep. 1993, pp. 55-65.*
Emhjellen et al. "Project valuation when there are two cashflow streams." Energy Economics 24:455-467 (2002).

* cited by examiner

*Primary Examiner*—Hani M Kazim
*Assistant Examiner*—Clifford Madamba
(74) *Attorney, Agent, or Firm*—Ballard Spahr LLP

(57) ABSTRACT

There is disclosed a technique for determining parameters of a long-term lease of an asset. The method involves determining a set of payments defining an amortisation path from an initial value (A) to a final residual value (M) of said asset over a long-term lease period, and determining a plurality of sets of short-term lease payments such that the plurality of sets of short-term lease paths define respectively one or more interim short-term lease paths (ADF, DGI, GJL) and a final short-term lease path (JM), each interim short-term lease path (ADF, DGI, GJL) consisting of an amortisation portion that corresponds to said amortisation path (AD, DG, GJ) for a respective short-term lease period and a termination amortisation portion (DF, GI, JL) that links the amortisation portion to a short-term termination value falling on a residual value path to said final residual value at a position such that the short-term lease corresponding to the short-term lease path satisfies a predetermined value condition, and the final short-term lease path (JM) consisting of an amortisation portion, whereby the plurality of amortisation portions of the interim and final short-term lease paths correspond collectively to said amortisation path.

9 Claims, 5 Drawing Sheets

METHOD OF DETERMINING PARAMETERS OF A LONG-TERM LEASE

CROSS-REFERENCE TO RELATED APPLICATIONS

The present application is a Continuation of U.S. application Ser. No. 11/481,122, filed Jul. 5, 2006 now abandoned, which claims priority to Australian Patent Application No. 2006900718, filed Feb. 14, 2006, which applications are incorporated herein fully by this reference.

FIELD

The invention relates to determining the parameters of a long-term lease.

BACKGROUND

With traditional leasing models it is difficult for the lessor to provide a future, end-of-useful-life residual value that is acceptable to the lessee.

The lessee will obtain the greatest financial advantage through the establishment of an operating lease, as defined by International Financial Reporting Standards (specifically IAS 17) and with terms that enable the closest possible matching of cash flows to the depreciation of the asset over its economic life. Financial evaluation is measured by achieving the highest possible Net Present Value (NPV) of cash flows over the life of the transaction at the rate of alternative cost of funds.

IAS 17 evaluates transfer of asset risk between the parties and specifically requires reference to a Present Value (PV) test as evidence that the lessor carries a substantial asset ownership risk. Current leases consist of a single term and pose numerous problems for lessees, for example:

Leases shorter than asset useful life may distort the charge against profit through a mismatching of amortisation charge with the income producing capability of the asset;

Lease versus buy comparisons using measures generally favour the buy case when leases are for a term shorter than the useful life and generally fail the PV test when applying parameters that would provide a positive NPV case for leasing;

Leases set for the full term of the useful life may limit flexibility for lessees who face cyclical demand for the use of a fleet of a particular asset group; and Loan covenants may restrict the establishment of leases that cover the full useful life of a large fleet of assets.

SUMMARY

In a first broad aspect, the invention provides a method of determining parameters of a long-term lease of an asset comprising:

determining a set of payments defining an amortisation path from an initial value to a final residual value of said asset over a long-term lease period;

determining a plurality of sets of short-term lease payments such that the plurality of sets of short-term lease paths define respectively one or more interim short-term lease paths and a final short-term lease path, each interim short-term lease path consisting of an amortisation portion that corresponds to said amortisation path for a respective short-term lease period and a termination amortisation portion that links the amortisation portion to a short-term termination value falling on a residual value path to said final residual value at a position such that the short-term lease corresponding to the short-term lease path satisfies a predetermined value condition, and the final short-term lease path consisting of an amortisation portion, whereby the plurality of amortisation portions of the interim and final short-term lease paths correspond collectively to said amortisation path.

In a preferred embodiment, the method further comprises determining a residual value path from an initial residual value to said final residual value.

In an embodiment, determining the residual value path involves determining initial residual value, the one or more short-term termination values and the final residual value.

In an embodiment, the method comprises determining said final residual value by at least determining a minimum viable final residual value of said long-term lease.

In an embodiment, determining said final residual value comprises selecting the higher value of said minimum residual value and the lessor's desired final residual value.

In an embodiment, determining each short-term termination value is performed at least in part by determining a minimum viable termination value.

In an embodiment, the method comprises determining the period of each short-term lease.

In an embodiment, determining the period of each short-term lease comprises determining the maximum short-term lease term that satisfies said predetermined value condition.

In an embodiment, the predetermined value condition is that the lease satisfies a present value test.

In another aspect, the invention provides a method of providing a long-term lease comprising dividing the long-term lease into a plurality of short-term leases comprising a final short-term lease; and one or more interim short-term leases each of which may be terminated by a termination payment such that each short term lease satisfies a predetermined value condition and completion of the long-term lease is optional.

In an embodiment, the method comprises determining a final residual value of said long-term lease by selecting the higher value of a minimum residual value and a lessor's desired final residual value.

In an embodiment, the method comprises determining a short-term termination values at least in part by determining a minimum viable termination value.

In an embodiment, the method comprises determining the period of each short-term lease.

In an embodiment determining the period of each short-term lease comprises determining the maximum short-term lease term that satisfies said predetermined value condition.

In an embodiment wherein the predetermined value condition is that the lease satisfies a present value test.

DETAILED DESCRIPTION OF THE DRAWINGS

Figure 1:
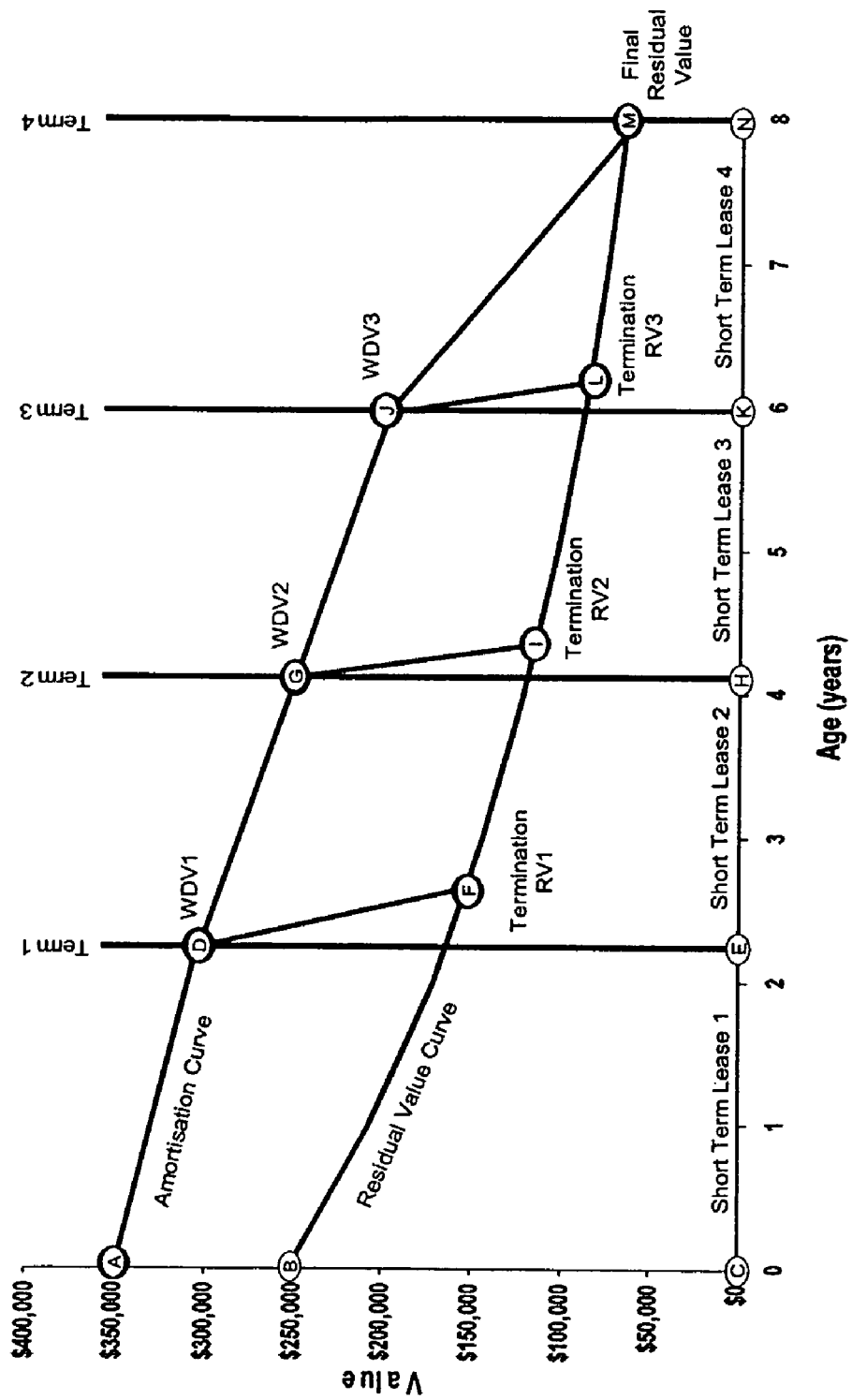
FIG. 1 is a graph illustrating a long-term lease split into four terms.
Figure 2:
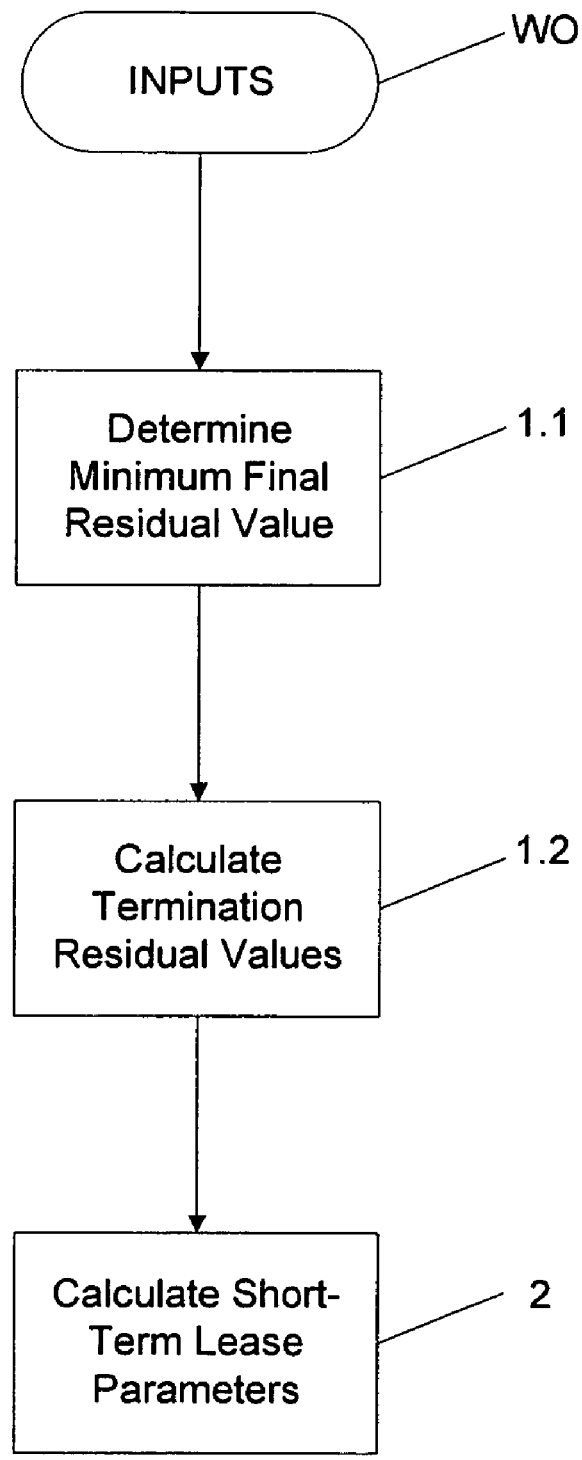
FIG. 2 is a flow chart that provides an overview of the process of determining the parameters of a long term lease.
Figure 3:
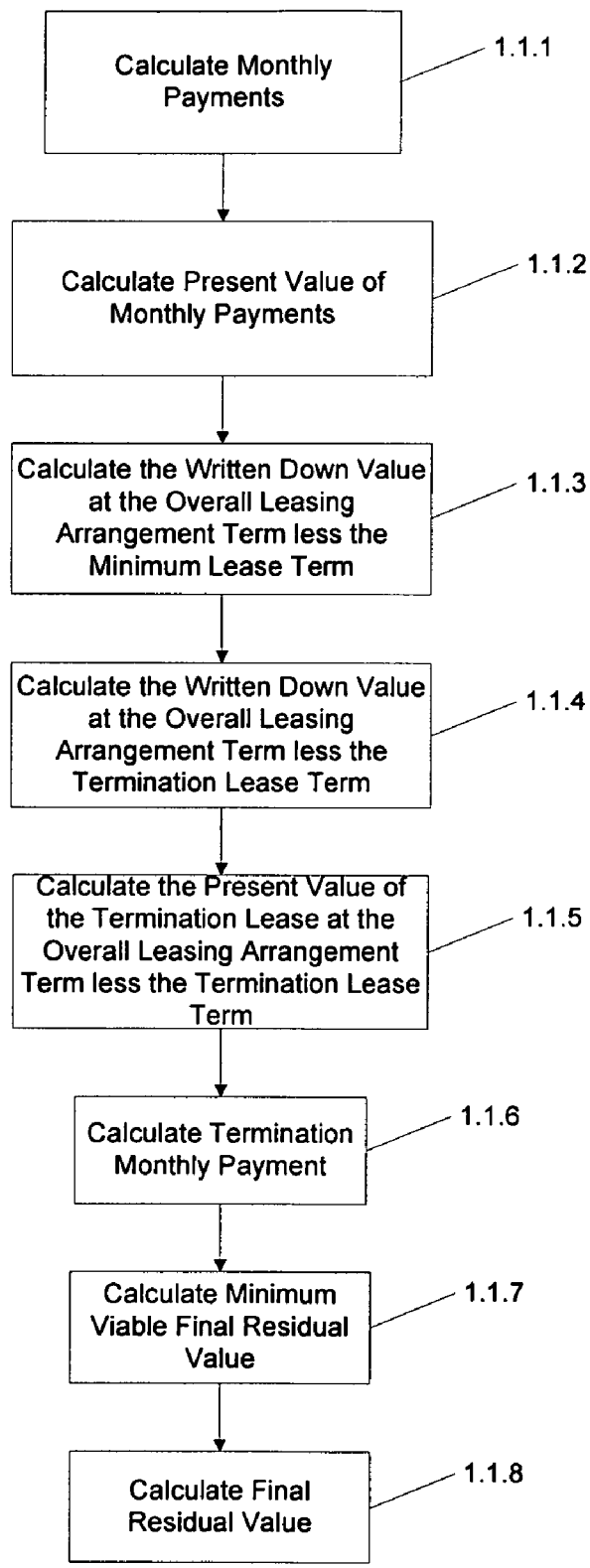
FIG. 3 is flow chart in the process of determining the final residual value.
Figure 4:
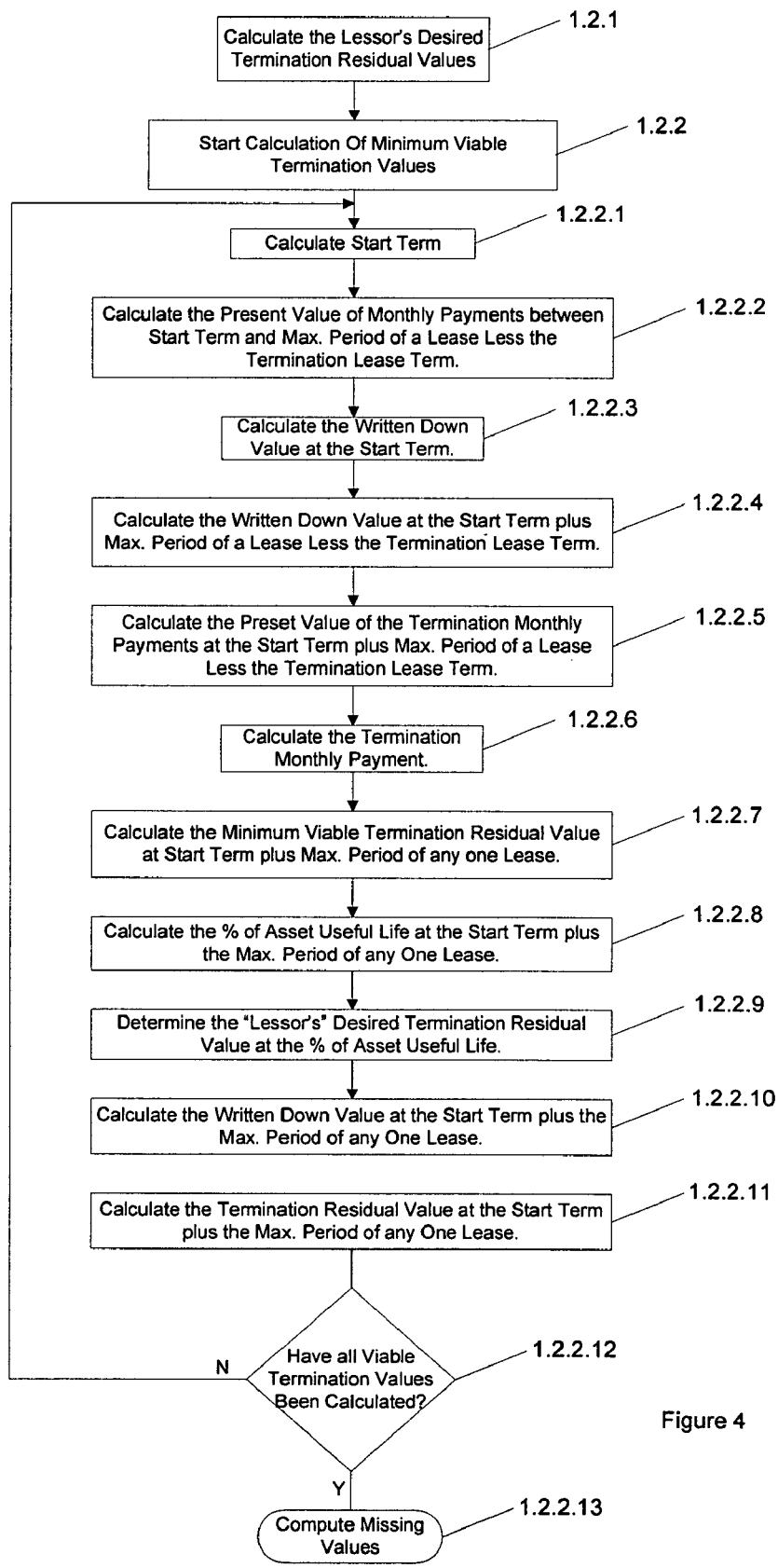
FIG. 4 is a flow chart showing how a set of viable termination values are calculated.
Figure 5:
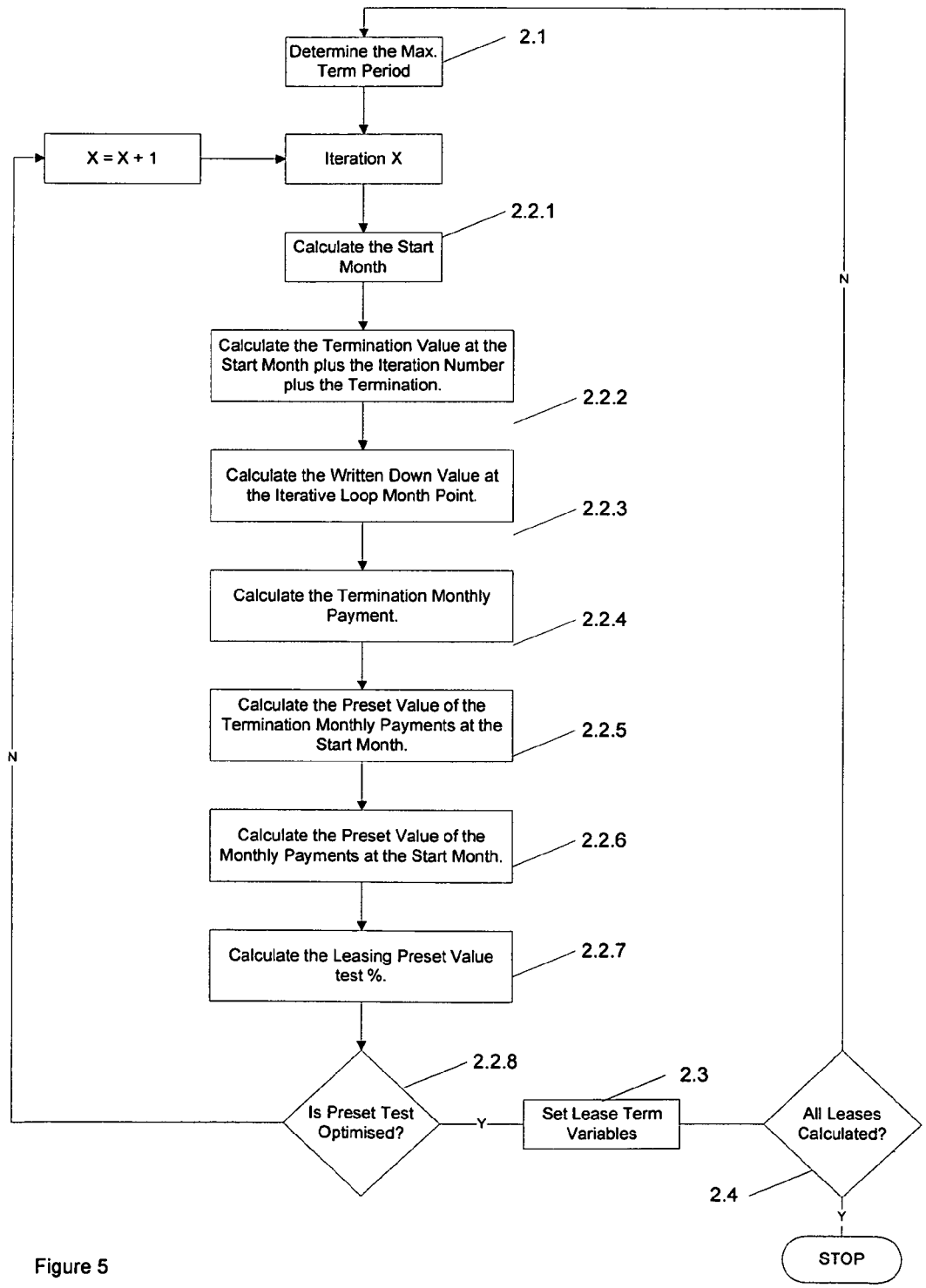
FIG. 5 is a flow chart showing how terms of the short term lease are determined.

The preferred embodiments provide a leasing model that enables determination of parameters of a long-term lease and hence the establishment of long-term leases consisting of a plurality of short-term leases such that completion of the long-term lease is optional.

The leasing model is based on four interdependent elements:

1. Dividing the expected useful life of an asset into two or more short-term time periods.

2. Establishing a lease for the first period and granting options for the lessee to take further leases for the subsequent short-term periods. The overall leasing arrangement would comprises a plurality of short-term leases.

3. Establishing an alternative obligation at the expiry of any lease period for the lessee to pay to a pre-agreed termination amount in the event that an option is not exercised.

4. Utilising a computerised calculation model to create an optimised cash flow of payments and set of leasing option periods whilst ensuring that PV compliance levels can be met for each of the nominated periods when combined with their respective termination obligations.

A range of additional commercial criteria may be introduced to govern issues of credit and operational risk, but none that would impact the asset ownership risk in respect of the individual asset lease.

The leasing model can be illustrated by reference to the graph of FIG. 1. The top curve (ADGJM) represents an amortisation curve that shows the outstanding capital amount under lease over time, following regular principal and interest payments. Each of the points represents a value at a point in time that would be the amortised value at the expiry of that particular lease term. Put another way, a set of amortisation payments define an amortisation path ADGJM to the Final Residual Value.

The bottom curve (BFILM) represents the residual value risk that a lessor would take over the assets age (or hours of operation) and each of the labelled points represents a value at a point in time that the lessor will accept as asset residual risk.

Vertical lines (AC, DE, GH, JK, MN) are the start/end points of the multiple short-term leases which make up the overall leasing arrangement.

Diagonal lines (DF, GI, JL) are the termination amortisation curves.

Thus, each of the leases are defined by a set of lease payments that define a short-term lease path ADF, DGI, GJL and JM respectively. There will be one or more (in the case of FIG. 1, three) interim short-term leases whose sets of payments have a plurality of amortisation payments that define an amortisation portion AD, DG, GH of the short-term lease path and one or more termination payments that define a termination amortisation portion that completes the short-term lease path ADF, DGI and GJL. A final short-term lease consists solely of an amortisation portion JM.

The short-term lease paths are calculated so as to satisfy a predetermined value condition. For example, the PV test percentage as specified by the Accounting Standards is calculated for each of the short-term leases on the monthly payments (from ADF, DGI, GJL and JM respectively).

The overall leasing arrangement of the example as depicted in FIG. 1 is broken up into four short-term leases, however, the actual number and period for each of the short-term leases will vary as calculated on a case by case basis.

The leasing model uses a financial modelling solution to ensure that the multiple short-term leases are linked together in such a manner as to create a viable effective long term leasing arrangement if the lessee elects to exercise all the options granted.

The points of the graph as illustrated in FIG. 1 are interrelated and interdependent. Thus changing one parameter's value affects all the others.

The leasing model of the preferred embodiment specifies that the amortisation curve is a true curve and that the monthly payment (both combined principal and interest) is constant. Applying these criteria together with the required PV rate and the commercial term elements of (a) principal value (b) assumed residual value (c) assumed useful life and (d) interest rate, a sequential iterative process, performed by software, can be used to determine the leasing parameters of all the short-term leases that comprise the overall leasing arrangement.

DEFINITIONS

In order to understand the preferred embodiment, a number of terms are defined with reference to the example of FIG. 1. The "points", "curves" and "lines" referred to in these definitions are those as indicated on the example in FIG. 1.

Additional Lease Fees or Monthly Administration Charges—these are lessor charges or imposts applicable when leasing and may include stamp duty, transaction fees, brokerage fees, administration charges etc.

Asset Purchase Price—requested monetary value for which finance is sought. (Point A)

Current Age (or Hours of Operation) of the Asset—This is the age or operational hours of the asset at the date when the lease transaction commences.

Economic Life refers to the full expected life of an asset for all owners until it is scrapped.

Final Residual Value—the Termination Residual Value at the end of the last Short-Term Lease (Point M). This value is an output from the calculation process and simplistically, is the greater of the Lessor's Desired Final Residual Value and the Minimum Viable Final Residual Value.

Future Value—the outstanding capital amount at a future point in time, based on periodic, constant payments and a constant interest rate. It is calculated from a mathematical or numerical formula, or a series of data points e.g. Excel's future value formulae FV(rate, nper, pmt, pv, tpe), The Rule of 78 Formula etc.

Interest Rate—the sum of the Lessor's interest base-rate and margin over base-rate.

Lease-Term Step—the Overall Leasing Arrangement comprises multiple Short-Term Leases and the various Short-Term Leases' Terms comprise multiple Lease-Term Steps. (Eg. if the Lease-Term Step was set at 6 months, the Short-Term Leases would be in multiples of 6 months.)

Leasing Present Value Test—detailed in AASB 17 and the newer IAS 17 Accounting Standards Leasing PV Test %—the chosen hurdle rate for the Leasing Present Value Test.

Lessor's Desired Final Residual Value—the lessor's desired Termination Residual Value at the end of the last Short-Term Lease. This value is an input to the model. (Point M)

Lessor's Desired Termination Residual Values—the lessor's desired Termination Residual Values over the Economic Life of the asset. These values are inputs to the model.

Long Term Assets—those where the lessee might expect to use the asset for more than seven years and possibly may use the asset for more than 75% of its Economic Life.

Maximum Period of Any One Lease—the maximum term of any Short-Term Lease. If this value is not known, then the maximum period defaults to the Overall Leasing Arrangement Term. This value also includes the Termination Lease Term.

Minimum Future Asset Life—how much longer the asset is expected to be used by another party, once the overall leasing arrangement has ended, before being scrapped.

Minimum Lease Term—the minimum desirable lease term of any Short-Term Lease. If this value is not known, then the Minimum Lease Term defaults to the Overall Leasing Arrangement Term. This value also includes the Termination Lease Term.

Minimum Viable Final Residual Value—this is a calculated Termination Residual Value at the end of the last Short-Term Lease (Point M) at which the LTAL model is guaranteed to work. This value is used within the calculation process.

Minimum Viable Termination Residual Values—this is a calculated Termination Residual Values over the Useful Life of the asset, at which the LTAL model is guaranteed to work. It is used within the calculation process.

Monthly Payment—the combined monthly principal and interest repayment of a lease, starting from the Asset Purchase Price and ending at the Final Residual Value over the Overall Leasing Arrangement Term. It is constant, based on a constant Interest Rate and follows a True Amortisation Curve.

Overall Leasing Arrangement—comprises the multiple short-term leases, over the Overall Leasing Arrangement Term.

Overall Leasing Arrangement Term—the total length of time for which the Lessee desires to lease the asset. (Line CO) This value is often, but not always, equal to the asset's Useful Life.

Present Value—the total amount that a series of future payments is worth now. Calculated from a mathematical or numerical formula, or a series of data points.

Short-term Lease—the Overall Leasing Arrangement comprises a multiple of Short-Term Leases.

Short-Term Lease Term—the total length of time of a Short-Term Lease (Lines CE, EH, HK, KN) and excludes the Termination Lease Term. The sum of all the Short-term Lease Terms equals the Overall Leasing Arrangement Term.

Termination Lease—the period following a short-term lease, which will be invoked if an option is not exercised to continue with any of the remaining short-term leases.

Termination Lease Term—normally set at three months but can varies depending on the asset type.

Termination Monthly Payment—the combined monthly principal and interest repayment of a lease, starting from the Written Down Value and ending at the Termination Residual Value over the Termination Lease Term. It is constant, based on a constant interest rate and follows a True Amortisation Curve. (eg. in FIG. 1, the Termination Monthly Payments occur between points D&F, G&I, J&L and J&M)

Termination Residual Values—these are the residual values that a lessor would hold at a series of points in time (points F, I, L and M), in the event that a Short-Term Lease was terminated. They are represented by the bottom curve (BFILM). These values are used within the calculation process and simplistically, are the greater of the Lessor's Desired Termination Residual Values and the Minimum Viable Termination Residual Values at every point along the bottom curve (points F, I, L and M).

'True' Amortisation Curve—this can be graphically depicted as a curve and shows the actual outstanding capital amount (i.e. the Written Down Value) at any point in the lease following regular Monthly Payments. At inception, it starts at the Asset Purchase Price and ends at the Final Residual Value at lease termination. It is calculated from a Future Value type formula.

Useful Life refers to the expected period of usage by the lessee.

Written Down Value—this is the outstanding capital amount under lease, based on periodic, constant monthly payments and a constant interest rate %. It is calculated at a point in time from the true amortisation curve.

The amortisation curve used in the calculations is a 'True' Amortisation Curve and thus the Monthly Payments (both combined principal and interest) are constant.

The parameters that are inputs to the model set out in Table 1.

TABLE 1

| Input Number | Input Parameter |
| --- | --- |
| 1 | Asset Purchase Price |
| 2 | Applicable Interest Rate at Maximum Period of Any One Lease |
| 3 | Overall Leasing Arrangement Term |
| 4 | Lease-Term Steps |
| 5 | Leasing PV Test % |
| 6 | Current Age (or hours of operation) of the Asset. (For new assets, this value is zero) |
| 7 | Termination Lease Term |
| 8 | Additional lease fees or monthly charges (if these values are not known, then default is assumed to be zero) |
| 9 | Estimated Minimum Future Asset Life |
| 10 | Maximum Period of Any One Lease |
| 11 | Lessor's Desired Final Residual Value |
| 12 | Lessor's Desired Termination Residual Values as a formula or as data points against age or operating hours |
| 13 | Payment at beginning of lease or at end (0 or 1) |
| 14 | Minimum Lease Term |

Persons skilled in the art will appreciate that depending on the embodiment, different input parameters may be applicable. Persons skilled in the art will also appreciate that various of the input parameters may require reference to commercial aspects of determining a lease. For example, input number 10 which describes the maximum period of any one lease can be determined by how much value needs to brought onto a balance sheet. For example, in a twenty year lease it may be desirable to bring 25% of the value of the asset onto the balance sheet. Hence a five year maximum term would be calculated. Persons skilled in the art can determine appropriate inputs based on their knowledge of leases and of the assets.

In the following description, a series of steps are set out. The numbering used to specify the steps is replicated in the flow charts of FIGS. 2 to 5 to further facilitate understanding of the invention.

Calculation of Leasing Parameters

The parameters of the leasing model are calculated in a series of steps as follows.

Step 1—RV determination and analysis

Step 1.1—Calculation of Minimum Viable Final Residual Value

Step 1.1.1)—Calculate the Monthly Payments.

Variable 1=PMT(rate, nper, pv, fv, type)

Where
   Pmt=Excel's Payment formula
   rate=Interest Rate (Input 2)/12
   nper=Overall Leasing Arrangement Term (Input 3)
   pv=Asset Purchase Price (Input 1)
   fv=−Lessor's Desired Final Residual Value (Input 11)
   type=Payment at beginning of lease or at end (0 or 1) (Input 13)

Step 1.1.2)—Calculate the present value of the Monthly Payments between 1) the Overall Leasing Arrangement Term less the Minimum Lease Term and 2) the Overall Leasing Arrangement Term less the Termination Lease Term Variable 2=PV(rate, nper, pmt, fv, type)

Where
   PV=Excel's Present Value formula
   rate=Interest Rate (Input 2)/12
   nper=Minimum Lease Term (input 14)−Termination Lease Term (input 7)
   pmt=Variable 1 from above
   fv=0
   type=Payment at beginning of lease or at end (0 or 1) (Input 13)

Step 1.1.3)—Calculate the Written Down Value at the Overall Leasing Arrangement Term less the Minimum Lease Term.

Variable 3=−FV(rate, nper, pmt, pv, type)

Where
   FV=Excel's Future Value formula
   rate=Interest Rate (Input 2)/12
   nper=Overall Leasing Arrangement Term (Input 3)−Minimum Lease Term (input 14)
   pmt=Variable 1 from above
   pv=Asset Purchase Price (input 1)
   type=Payment at beginning of lease or at end (0 or 1) (Input 13)

Step 1.1.4)—Calculate the Written Down Value at the Overall Leasing Arrangement Term less the Termination Lease Term Variable 4=−FV(rate, nper, pmt, pv, type)

Where
   FV=Excel's Future Value formula
   rate=Interest Rate (Input 2)/12
   nper=Overall Leasing Arrangement Term (Input 3)−Termination Lease Term (input 7)
   pmt=Variable 1 from above
   pv=Asset Purchase Price (input 1)
   type=Payment at beginning of lease or at end (0 or 1) (Input 13)

Step 1.1.5)—Calculate the present value of the Termination Lease at the Overall Leasing Arrangement Term less the Termination Lease Term.

Variable 5=((Leasing PV Test %)*(Variable 3)−(Variable 2))*((1+(Interest Rate)/12)^(((Minimum Lease Term)−(Termination Lease Term))))

Where
   Leasing PV Test %=(Input 5)
   Interest Rate=(Input 2)
   Minimum Lease Term (input 14)
   Termination Lease Term=(input 7)

Step 1.1.6)—Calculate the Termination Monthly Payment

Variable 6=((Variable 5)*((1+(Interest Rate)/12)^(Termination Lease Term))/(1+(Interest Rate)/12*(type))/(((1+(Interest Rate)/12)^(Termination Lease Term))−1)/((Interest Rate)/12)))

Where
   Interest Rate=(Input 2)
   Termination Lease Term=(input 7)
   type=Payment at beginning of lease or at end (0 or 1) (Input 13)

Step 1.1.7)—Calculate the Minimum Viable Final Residual Value

Variable 7=(Variable 4)*((1+(Interest Rate)/12)^(Termination Lease Term))−(Variable 6)*(1+(Interest Rate)/12*(type))*(((1+(Interest Rate)/12)^(Termination Lease Term))−1)/((Interest Rate)/12)

Where
   Interest Rate=(Input 2)
   Termination Lease Term=(input 7)
   type=Payment at beginning of lease or at end (0 or 1) (Input 13)

Step 1.1.8)—The Final Residual Value (Variable 8) is the greater of the calculated Minimum Viable Final Residual Value (Variable 7) and the Lessor's Desired Final Residual Value (Input 11)

Step 1.2—Calculate the Termination Residual Values

The Lessor's Desired Termination Residual Values are compared against the Minimum Viable Termination Residual Values, calculated at the Maximum Period of Any One Lease. The higher of the values becomes the Termination Residual Value. This process is detailed below:

Step 1.2.1)—Calculate the Lessor's Desired Termination Residual Values and convert to a standardised format.

The Lessor has the option of presenting the Lessor's Desired Termination Residual Values, per asset or asset type, in a formula, graph or series of data points. This source data is converted into a standardised format and in the preferred embodiment the Lessor's Desired Termination Residual Value is specified as a percentage of the Asset Purchase Price, over its Economic Life as a percent. See Table 2 for an example.

The conversion of source data to a standardised format is typically a manual process that occurs at the stage when the data is being inputted into the model. The conversion method used depends on the nature and format of the source data. However, persons skilled it the art will appreciate that conversion routines can be written to process electronic source data.

TABLE 2

| | Lessor's Desired Termination Residual Value as a % of the Asset Purchase Price | | | | | | | | | | |
|---|---|---|---|---|---|---|---|---|---|---|---|
| | Percentage of Economic Life | | | | | | | | | | |
| Type of Asset | 0% | 10% | 20% | 30% | 40% | 50% | 60% | 70% | 80% | 90% | 100% |
| Eg Volvo FM 12 Truck | 80% | 70% | 65% | 60% | 55% | 50% | 48% | 45% | 43% | 40% | 38% |

TABLE 2-continued

Lessor's Desired Termination Residual Value as a % of the Asset Purchase Price

| | Percentage of Economic Life | | | | | | | | | | |
|---|---|---|---|---|---|---|---|---|---|---|---|
| Type of Asset | 0% | 10% | 20% | 30% | 40% | 50% | 60% | 70% | 80% | 90% | 100% |
| Eg. Front End loader | 60.1% | 53.4% | 46.5% | 40.0% | 35.8% | 29.6% | 21.3% | 12.9% | 10.2% | 9.0% | 8.6% |

Electronically, the Lessor's Desired Termination Residual Values as a % of the Asset Purchase Price are stored in an array called Desired_Termination_RV_Array( ).

Step 1.2.2)—Calculate the Minimum Viable Termination Residual Values. In an iterative loop from 0 to 1, with a step of 0.1, the following variables are calculated Step 1.2.2.1)—Calculate the Start Term at the iterative value point.

Variable 9=Overall Leasing Arrangement Term*Iteration #

Where
Overall Leasing Arrangement Term=(input 4)
Iteration #=the current value of the iterative loop Step 1.2.2.2)—Calculate the present value of the Monthly Payments between 1) Variable 9 and 2) the Maximum Period of Any One Lease less the Termination Lease Term Variable 10=PV(rate, nper, pmt, fv, type)

Where
PV=Excel's Present Value formula
rate=Interest Rate (Input 2)/12
nper=Maximum Period Of Any One Lease (input 10)– Termination Lease Term (input 7)
pmt=Variable 1 from above
fv=0
type=Payment at beginning of lease or at end (0 or 1) (Input 13)

Step 1.2.2.3)—Calculate the Written Down Value at Variable 9

Variable 11=–FV(rate, nper, pmt, pv, type)

Where
FV=Excel's Future Value formula
rate=Interest Rate (Input 2)/12
nper=Variable 9 from above
pmt=Variable 1 from above
pv=Asset Purchase Price (input 1)
type=Payment at beginning of lease or at end (0 or 1) (Input 13)

Step 1.2.2.4)—Calculate the Written Down Value at Variable 9 plus the Maximum Period of Any One Lease less the Termination Lease Term Variable 12=–FV(rate, nper, pmt, pv, type)

Where
FV=Excel's Future Value formula
rate=Interest Rate (Input 2)/12
nper=Variable 9 plus the Maximum Period Of Any One Lease (input 10) less the Termination Lease Term (input 7)
pmt=Variable 1 from above
pv=Asset Purchase Price (input 1)
type=Payment at beginning of lease or at end (0 or 1) (Input 13)

Step 1.2.2.5)—Calculate the present value of the Termination Monthly Payments at Variable 9 plus the Maximum Period of Any One Lease less the Termination Lease Term Variable 13=((Leasing PV Test %)*(Variable 11)–(Variable 10))*((1+(Interest Rate)/12)^(((Maximum Period of Any One Lease)–(Termination Lease Term))))

Where
Leasing PV Test %=(Input 5)
Interest Rate=(Input 2)
Maximum Period of Any One Lease (input 10)
Termination Lease Term=(input 7)

Step 1.2.2.6)—Calculate the Termination Monthly Payment

Variable 14=((Variable 13)*((1+(Interest Rate)/12)^(Termination Lease Term))/(1+(Interest Rate)/12*(type))/((((1+(Interest Rate)/12)^(Termination Lease Term))–1)/((Interest Rate)/12)))

Where
Interest Rate=(Input 2)
Termination Lease Term=(input 7)
type=Payment at beginning of lease or at end (0 or 1) (Input 13)

Step 1.2.2.7)—Calculate the Minimum Viable Termination Residual Value at Variable 9 plus Maximum Period of Any One Lease Variable 14=((Variable 13)*((1+(Interest Rate)/12)^(Termination Lease Term))/(1+(Interest Rate)/12*(type))/((((1+(Interest Rate)/12)^(Termination Lease Term))–1)/((Interest Rate)/12)))

Where
Interest Rate=(Input 2)
Termination Lease Term=(input 7)
type=Payment at beginning of lease or at end (0 or 1) (Input 13)

Step 1.2.2.8)—Calculate the % of Asset Useful life of the point Variable 9 plus the Maximum Period of Any One Lease Variable 16=((Variable 9)+(Current Age)+(Maximum Period of Any One Lease))/((Overall Leasing Arrangement Term)+(Estimated Minimum Future Asset Life))

Where
Current Age=(input 6)
Maximum Period of Any One Lease=(Input 10)
Overall Leasing Arrangement Term=(input 3)
Estimated Minimum Future Asset Life=(Input 9)

Step 1.2.2.9)—Determine the Lessor's Desired Termination Residual Value at the % of Asset Useful life
Variable 17 is calculated from the following routine:

```
If Variable 16 <> 0 Then
    For i = 0 To 10
        If i / 10 >= Variable 16 Then
            X0 = i
            X1 = i + 1
            Exit For
        End If
    Next i
    Y0 = Desired_Termination_RV_Array( ) (X0)
    Y1 = Desired_Termination_RV_Array( ) (X1)
    RV_Interpolate = Y1 + (Y1 – Y0) / (X1 – X0) *
(Variable 16 – X0)
Else
    RV_Interpolate = 0
End If
Variable 17 = RV_Interpolate * APP
```

Where
Desired_Termination_RV_Array( )=Array of residual values determined under Step 1.2.1 above
Variable 16 from above
X0, X1, Y0 and Y1 are intermediate variables used in this subroutine only Step 1.2.2.10)—Calculate the Written Down Value at the point Variable 9 plus Maximum Period of Any One Lease Variable 18=–FV(rate, nper, pmt, pv, type)

Where
FV=Excel's Future Value formula
rate=Interest Rate (Input 2)/12
nper=Variable 9+Maximum Period of Any One Lease
pmt=Variable 1
pv=Asset Purchase Price (input 1)
type=Payment at beginning of lease or at end (0 or 1) (Input 13)

Step 1.2.2.11)—Calculate the Termination Residual Value at the point Variable 9 plus Maximum Period of Any One Lease Variable 19=Min(MAX((Variable 15), (Variable 17)), (Variable 18)))

Where
Min=Excel's Min formula
Max=Excel's Max formula

Variable 19 is stored in an array called Termination_R-V_Array( )

Step 1.2.2.12—The iterative loop as detailed under Step 1.2.2) reiterates until complete, with each Termination Residual Value being stored in the Termination_RV_Array( )

Step 1.2.2.13—The missing elements of the Termination_R-V_Array( ) are computed by:
  setting all Termination_RV_Array( ) values at array locations less than (Maximum Period of Any One Lease)/((Overall Leasing Arrangement Term)+(Estimated Minimum Future Asset Life)) equal to the array value at array location equal to (Maximum Period of Any One Lease)/((Overall Leasing Arrangement Term)+(Estimated Minimum Future Asset Life))
  setting all Termination_RV_Array( ) values at array locations greater than (Overall Leasing Arrangement Term)/((Overall Leasing Arrangement Term)+(Estimated Minimum Future Asset Life)) equal to the array value at array location equal to (Overall Leasing Arrangement Term)/((Overall Leasing Arrangement Term)+(Estimated Minimum Future Asset Life))

Step 2—Calculation of Short-Term Lease parameters:

Step 2.1)—Determine the Max Term Period

Variable 100=Min(Overall Leasing Arrangement Term–Sum(all currently calculated Short-Term Lease Terms), Maximum period of any one lease)

Where
Min=Excel's Minimum formula
Overall Leasing Arrangement Term=(Input 3)
Sum=Excel's Sum formula
Sum (all currently calculated Short-Term Lease Terms)—This sum is equal to zero for the first short term lease. For the second short term lease it equals the first short term lease term. (Variable 108). For the third short term lease it equals the first short term lease term+second short term lease term. Etc.)
Maximum period of any one lease (Input 10)

Step 2.2—In an iterative loop, starting from the 1st month to the value of Variable 100, iterating in Lease-Term Steps, the following calculations are performed:

Step 2.2.1—Calculate the Start Month

Variable 101=Sum(all currently calculated Short-Term Lease Terms)

Where
Sum=Excel's Sum formula
This variable is equal to zero for the first short term lease.
For the second short term lease it equals the first short term lease term (Variable 108)
For the third short term lease it equals the first short term lease term+second short term lease term (Variable 108)
etc Step 2.2.2—Calculate the Termination Residual Value at the Start Month (Variable 108) plus the iterative loop # plus the Termination Lease Term Variable 102=TRV((Variable 101), Iteration #1 Overall Leasing Arrangement Term, Termination Lease Term, (Variable 8), Termination_R-V_Array( ), Asset Purchase Price)

Where
TRV=a subroutine which looks up the Termination Residual Value at the iterative loop month point plus the Termination Lease Term from the Termination_R-V_Array( )
Iteration #=the current value of the iterative loop
Overall Leasing Arrangement Term (Input 3)
Termination Lease Term=(input 7)
Termination_RV_Array( )
Asset Purchase Price (input 1)

Step 2.2.3—Calculate the Written Down Value at the iterative loop month point

Variable 103=–FV(rate, nper, pmt, pv, type)

Where
FV=Excel's Future Value formula
rate=Interest Rate (Input 2)/12
nper=Iteration # (the current value of the iterative loop)
pmt=Variable 1 from above
pv=Asset Purchase Price (input 1)
type=Payment at beginning of lease or at end (0 or 1) (Input 13)

Step 2.2.4—Calculate the Termination Monthly Payment

Variable 104=−PMT(rate, nper, pv, fv, type)

Where
Pmt=Excel's Payment formula
rate=Interest Rate (Input 2)/12
nper=Termination Lease Term (input 7)
pv=Variable 103
fv=−Variable 102
type=Payment at beginning of lease or at end (0 or 1) (Input 13)

Step 2.2.5—Calculate the PV of the Termination Monthly payments at the Start Month (Variable 101)

Variable 105=−PV(rate, nper, pmt, fv, type)*((1+rate)^(−Iteration #))

Where
PV=Excel's Present Value formula
rate=interest rate (Input 2)/12
nper=Termination Lease Term (input 7)
pmt=Variable 104 from above
fv=0
type=Payment at beginning of lease or at end (0 or 1) (Input 13)
Iteration #=the current value of the iterative loop Step 2.2.6—Calculate the PV of the Monthly Payments at the Start Month (Variable 101)

Variable 106=PV(rate, nper, pmt, fv, type)

Where
PV=Excel's Present Value formula
rate=Interest Rate (Input 2)/12
nper=Iteration # (the current value of the iterative loop)
pmt=Variable 1 from above
fv=0
type=Payment at beginning of lease or at end (0 or 1) (Input 13)

Step 2.2.7—Calculate the Leasing PV test %

Variable 107=((Variable 105)+(Variable 106))/(Asset Purchase Price)

Where
Asset Purchase Price=(input 1)
Step 2.2.8—Decide whether or not to continue with the iteration loop
Variable 107 is compared the Leasing PV Test % (Input 5).
If Variable 107 is less or equal to the Leasing PV Test %, the iterative loop under Step 2.2 advances another month or step of months.
If Variable 107 is greater than the Leasing PV Test %, the iterative loop ceases and the first Short-term lease term (variable 108) is calculated as the current iterative loop value less a month or step of months as appropriate.

Step 2.3—Once a viable lease term is determined as described above for the first short term lease, the following calculated variables are displayed along with the appropriate input data:
Lease Term (variable 108)
Written Down Value (Variable 103)
Termination Residual value (Variable 102)
Monthly Payment (Variable 1)
Termination payment (Variable 104)
PV Test % (Variable 107)
Interest rate (Input 2)

Step 2.4—Once all the variables for the first short-term lease have been calculated, the Written Down Value (Variable 103) of the first Short-Term Lease becomes the Asset Purchase Price (Input 1) in the second Short-Term Lease. The iterative loop as detailed above reiterates until all the parameters for the second Short-Term Lease have been determined. This process continues until all the Short-Term Lease parameters have been calculated.

Persons skilled in the art will appreciate that the steps as detailed above can be completed in different sequences to achieve the same result. In some instances however the formulas in the steps will require small changes to account for the change in sequence.

Step 1 before Step 2
Step 1 and 2 could be merged into one collective step. In this case Step 1 must be completed before Step 2.2.2
Step 1.1 before Step 1.2
Step 1.1 and 1.2 could be merged into one collective step. In this case Step 1.1 must be completed before Step 1.2.2.13
Step 1.1.1 before Step 1.1.2
Steps 1.1.2 to 1.1.7 can be completed in any order before Step 1.1.8
Step 1.2.1 before Step 1.2.2
Step 1.2.1 and 1.2.2 could be merged into one collective step. In this case Step 1.2.1 must be completed before Step 1.2.2.9
Step 1.2.2.1 before Steps 1.2.2.2 to 1.2.2.8.
Steps 1.2.2.2 to 1.2.2.8 can be in any order.
Steps 1.2.2.2 to 1.2.2.8 before Steps 1.2.2.9 to 1.2.2.11. Steps 1.2.2.9 to 1.2.2.11 can be in any order.
Steps 1.2.2.9 to 1.2.2.11 before Step 1.2.2.12 before Step 1.2.2.13
Step 2.1 before Step 2.2 before Steps 2.3 to 2.4. Steps 2.3 to 2.4 can be in any order.
Step 2.2.1 before Steps 2.2.2 to 2.2.6. Steps 2.2.2 to 2.2.6 can be in any order.
Steps 2.2.2 to 2.2.6 before Step 2.2.7 before Step 2.2.8

The leasing model uses various inputs and calculation methods to create its results. The types of inputs and methods can be changed and will yield a different, yet still valid result. Input variances include:

1. Input 2—Applicable Interest Rate at Maximum Period of Any One Lease. Instead of using one constant interest rate at the Maximum Period of Any One Lease, the model can be adapted to use a series of interest rates at various terms (eg, 1 month, 3 months, 6 months, 12 months, 2 years, 3 years, 5 years, 10 years etc). This would improve the accuracy of the model for the option periods.

2. Where a Present Value is calculated, the interest rate used is an approximation to the indicative lease interest rate. The model could be refined to calculate the indicative lease interest rate (as detailed in the relevant Accounting Standards) and use it in place of Input 2. This is applicable under Steps 1.1.2, 1.1.5, 1.2.2.2, 1.2.2.5, 1.2.2.6 1.2.2.7, 2.25 and 2.26

3. When calculating the Minimum Viable Termination Residual Values under Step 1.2.2, the use of the Maximum Period of Any One Lease will provide a higher Minimum Viable Termination Residual Values than calculations using the Minimum Lease Term. The Minimum Lease Term can be used however the Short-Term Lease Terms will all be equal to, or very close to, the minimum lease term. The use of this value depends on the preference of the Lessor and Lessee.

4. If Input 6 is based on or hours of operation of the Asset, Step 1.2.2 will need to be modified to accommodate for hours instead of months 5. The leasing model records the Lessor's Desired Termination Residual Value as a percentage of the Asset Purchase Price, over its Economic Life. This format was chosen for its simplicity however the Lessor's Desired Termination Residual Values can be recorded in many different ways. The leasing model would need to be adjusted to compensate for the way the data is recorded.

6. We have chosen to store the Lessor's Desired Termination Residual Values in an array however they can be stored in any electronically readable format (eg internal or external data base, word document, excel spread sheet etc). Once calculated for a particular asset type or class, this data can be stored and reused if applicable on similar assets, if required.

7. The leasing Model is based on using Excel's standard amortisation formulas of Pmt, PV and FV. It can be easily modified to use other amortisation formulas (Eg. 'Rule of 78'), numerical formulas, or a series of data points.

It will be appreciated that the above method is computerised and employs an automated, iterative computer programmed which relies on certain inputs. Accordingly, while the invention has been described as a method, the invention could also be embodied in a computer program to carry out the above steps on receipt of relevant inputs. In this respect, persons skilled in the art will appreciate that a number of different computer configurations could be used, for example a client server configuration, a stand-alone, or a web-based server configuration.

Further, the above method could be embodied as executable program code that when executed by a computer will cause a computer to carry out the above steps. In this respect, persons skilled in the art will appreciate that the computer executable program code could be stored on a computer readable medium. Persons skilled in the art will appreciate that the code could be transferred from one storage medium to another using a number of techniques, including download from the world wide web.

The above method is a computerised method that employs an automated, iterative computer program which relies on certain inputs. Less preferred embodiments can be used to determine leasing parameters to varying degrees of accuracy. These include:

1. Algebraic methods that involve solving a series of simultaneous, non-linear equations.
2. Employing a commercially available simulation program.
3. Using a trial and error method in conjunction with a program such as Excel (available from Microsoft).

We have constructed an Excel based trial and error model (TEM) that can be used for checking lease calculations as described above. This method can be used to calculate leasing parameters although not efficiently to the same level of accuracy as our computerised method.

The TEM methodology to calculate the parameters of the long term lease is as follows:

1. For the first short term lease
   a. The Asset Purchase Price, Final Residual Value, Overall Leasing Arrangement Term, the Maximum Period any One Lease and Minimum Lease Term, Leasing PV Test % and Interest Rate are known.
   b. The operator guesses the first Short Term Lease Term, the Written Down Value, the Termination Residual Value and a simple model calculates the Monthly Payment using Excel's PMT( ) formula (other payment formulas (eg. Rule of 78) can also be used) and the Leasing Present Value Test from Excel's PV( ) formula.
   c. The operator may continue to adjust and re-input the first lease's parameters in step 1b above until the Leasing Present Value Test is less than or equal to the Leasing PV Test %.
   d. In a more 'advanced' models the Written Down Value can also be calculated using Excel's FV( ) formula.

2. For the second and subsequent short term leases. up until the second last one
   a. The Written Down Value as guessed or calculated in step 1 above becomes the Asset Purchase Price for the second short term lease.
   b. As before, the operator guesses the second Short Term Lease Term, the Written Down Value, the Termination Residual Value and a simple model calculates the Monthly Payment using Excel's PMT( ) formula and the Leasing Present Value Test from Excel's PV( ) formula.
   c. The operator will continue to adjust and re-input the second lease's parameters in step 2b to ensure that the Leasing Present Value Test is less than or equal to the Leasing PV Test %, and the Monthly Payment for the second lease is equal to that of the first lease.
   d. The abovementioned process will be continued until the lease parameters for the subsequent lease periods are calculated, with the Written Down Value of the previous lease period becoming the Asset Purchase Price of the next lease.

3. For the final short term lease
   a. The Written Down Value for the penultimate lease period, as guessed or calculated in step 2b/c above, becomes the Asset Purchase Price for the final short term lease.
   b. The Termination Residual Value is equal to the Final Residual Value which is given.
   c. The final Short Term Lease Term is calculated by subtracting the Short Term Lease Terms, calculated in steps 1 and 2 above from the Overall Leasing Arrangement Term.
   d. The operator guesses the Written Down Value and a simple model calculates the Monthly Payment using Excel's PMT( ) formula and the Leasing Present Value Test from Excel's PV( ) formula.
   e. The operator will continue to adjust and re-input the final lease's parameters in step 3b to ensure that the Leasing Present Value Test is less than or equal to the Leasing PV Test %, and the calculated Monthly Payment for all the short term leases is equal. At this stage the operator may have to manually rerun the entire iteration from steps 1b to steps 3e, in order to get the Monthly Payment to be equal or almost equal, and for all Leasing Present Value Test to be less than or equal to the Leasing PV Test %. In some instances, the initial given inputs of Asset Purchase Price, Overall Leasing Arrangement Term, the Maximum Period any One Lease and Minimum Lease Term, Leasing PV Test % and Interest Rate may be tweaked to achieve the goals of equal Monthly Payments across the Overall Leasing Arrangement and an acceptable Leasing Present Value Test
   f. Once calculated the same parameters as calculated under the LTAL Model will be displayed/printed out.

EXAMPLE 1

Tables 3 to 6 provide an example of the inputs and outputs of the leasing model for an overall leasing arrangement comprising 2 short-term leases:

TABLE 3

Input

| Asset Description | Minimum Future Asset Life (Mths) | Lenght of Termination Lease (Mths) | Asset Purchase Price | Final Residual Value | Interest Rate | Overall Leasing Arrangement Term (Mths) |
|---|---|---|---|---|---|---|
| New Process Unit (Refurb at end of life) | 12 | 3 | $475,000 | $70,000 | 7.55% | 120 |
| Volvo FM12 Truck 8 × 4 | 12 | 3 | $220,000 | $40,000 | 7.55% | 120 |

TABLE 4

Output: Short Term Lease 1

| PV1 | WDV1 | Termination RV1 | T1 (Mths) | PMT1 (Per Month) | Termination PMT1 (Per Month) | PV Test | % Remain. Life Test |
|---|---|---|---|---|---|---|---|
| $475,000 | $366,271 | $119,682 | 42 | $5,258 | $83,986 | 81.3% | 32% |
| $220,000 | $163,674 | $56,740 | 48 | $2,393 | $36,451 | 81.6% | 36% |

TABLE 5

Output: Short Term Lease 2

| PV2 | WDV2 | Termination RV2 | T2 (Mths) | PMT2 (Per Month) | Termination PMT2 (Per Month) | PV Test | % Remain. Life Test |
|---|---|---|---|---|---|---|---|
| $366,271 | $269,072 | $80,030 | 30 | $5,258 | $64,312 | 82.5% | 33% |
| $163,674 | $87,562 | $40,000 | 48 | $2,393 | $16,306 | 82.6% | 57% |

TABLE 6

Output: Short Term Lease 3

| PV3 | WDV3 | Termination RV3 | T3 (Mths) | PMT3 (Per Month) | Termination PMT3 (Per Month) | PV Test | % Remain. Life Test |
|---|---|---|---|---|---|---|---|
| $269,072 | $70,000 | $70,000 | 48 | $5,258 | | 81.3% | 80% |
| $87,562 | $40,001 | $40,000 | 24 | $2,393 | $252 | 61.8% | 67% |

Various other modifications will be apparent to persons skilled in the art and should be considered as falling within the scope of the invention described herein.

The invention claimed is:

1. A method of determining parameters of a long-term lease of an asset comprising:

determining with a computer a set of payments defining an amortisation path from an initial value to a final residual value of said asset over a long-term lease period; and determining with a computer a plurality of sets of short-term lease payments comprising one or more interim short-term payment sets and a final short-term payment set, each set of short-term lease payments corresponding to a short-term lease, each interim short-term payment set comprising a plurality of amortisation payments that corresponds to said amortisation path for a respective short-term lease period and at least one termination amortisation payment that provides a pre-set short-term termination residual value falling on a residual value path to said final residual value at a position such that the short-term lease payment set satisfies a predetermined value condition, the final short-term lease payment set comprising a plurality of amortisation payments, that corresponds to said amortisation path for a respective short-term lease period, whereby the amortisation payments of the interim and final short-term lease payment sets correspond collectively to said amortisation path, the short term lease periods of the interim and final short-term lease payment sets being co-terminus, and the quantum of individual amortisation payments in each set being substantially the same as the quantum of individual amortisation payments in each other set.

2. A method as claimed in claim 1, further comprising determining a residual value path from an initial residual value to said final residual value.

3. A method as claimed in claim 2, wherein determining the residual value path includes determining an initial residual value, the one or more short-term termination values and the final residual value.

4. A method as claimed in claim 1, wherein determining said final residual value includes determining a minimum viable final residual value of said long-term lease.

5. A method as claimed in claim 4, wherein determining said final residual value comprises selecting the higher value of said minimum residual value and the lessor's desired final residual value.

6. A method as claimed in claim 1, wherein determining each short-term termination value includes determining a minimum viable termination value.

7. A method as claimed in claim 1, comprising determining the period of each short-term lease.

8. A method as claimed in claim 7, wherein determining the period of each short-term lease comprises determining the maximum short-term lease term that satisfies said predetermined value condition.

9. A method as claimed in claim 1, wherein the predetermined value condition is that the lease satisfies a present value test.

* * * * *